June 10, 1930.  W. J. CHISM  1,762,651
NUT LOCKING WASHER
Filed Aug. 14, 1929
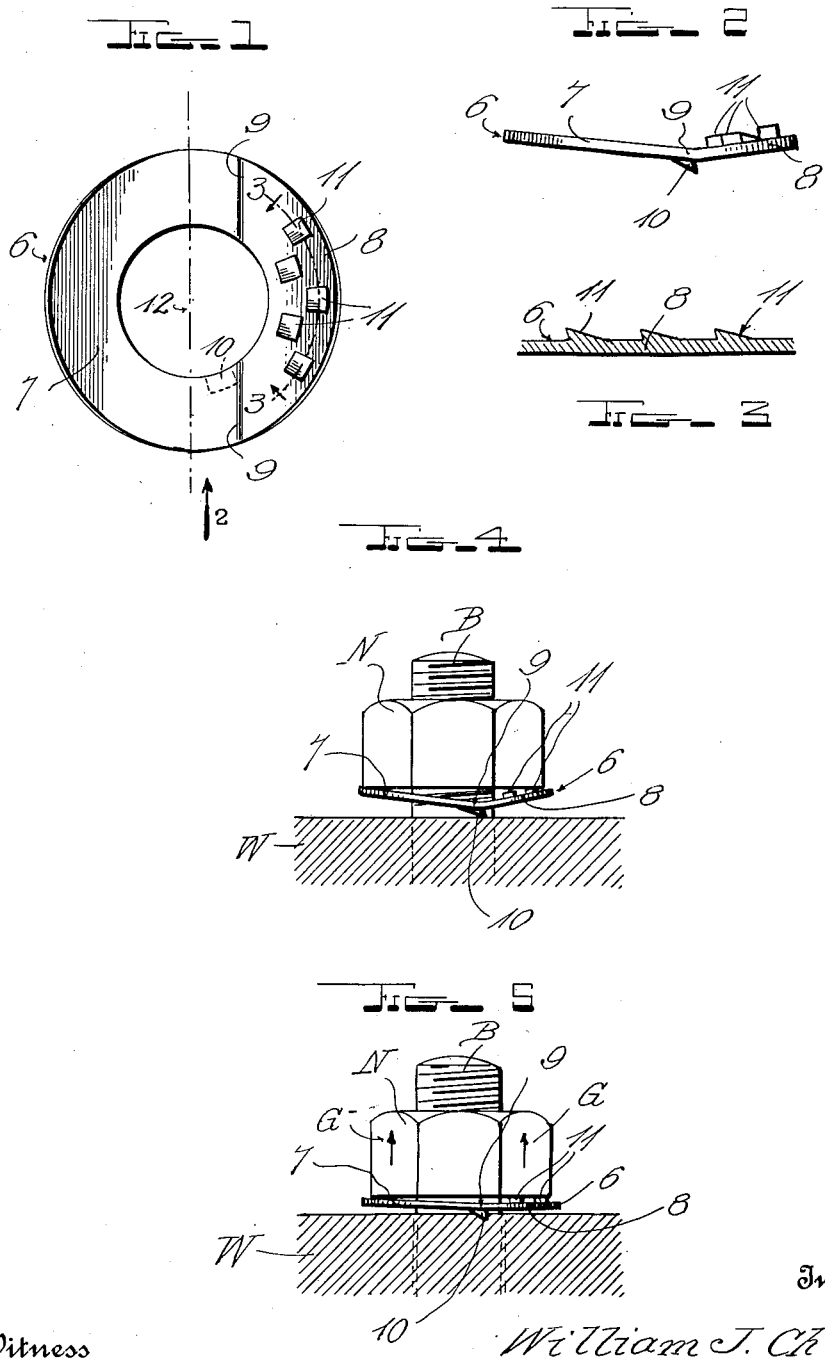

Patented June 10, 1930

1,762,651

UNITED STATES PATENT OFFICE

WILLIAM J. CHISM, OF ROCK HAVEN, KENTUCKY

NUT-LOCKING WASHER

Application filed August 14, 1929. Serial No. 385,731.

The invention aims to provide an exceptionally simple and inexpensive nut locking washer, yet one of unusual strength and so constructed as to obtain unequal pressure upon opposite sides of the nut, thereby tending to cant the latter and consequently binding the threads of the nut frictionally against the threads of the bolt.

A further object is to provide a washer of the type defined, provided also with nut and work-engaging teeth which upon tendency of the nut to rotate retrogradely, will bite into said nut and into the work held thereby, positively preventing such rotation without the application of force by means of a wrench.

With the foregoing in view, the invention resides in the novel subject matter hereinafter described and claimed, description being accomplished by reference to the accompanying drawing.

Fig. 1 is a plan view of a washer constructed in accordance with my invention.

Fig. 2 is an edge view looking in the direction of the arrow 2 of Fig. 1.

Fig. 3 is a fragmentary sectional view on line 3—3 of Fig. 1.

Fig. 4 is a side elevation showing the washer applied before tightening of the nut.

Fig. 5 is a view similar to Fig. 4, the nut however being tightened to almost a final position.

The drawing above briefly described may be considered as showing the preferred construction and while such construction will be specifically explained, it is to be understood that various changes in form, size, proportions, materials, etc., may be made within the scope of the invention as claimed. Moreover, while the washer herein disclosed is of resilient form and preferably made of spring steel, it may be explained that a washer possessing the novelty hereinafter explained, could well function if cast or moulded or of rigid nature.

The washer is indicated as a whole by the numeral 6. This washer is provided with a flat major portion 7 occupying considerably more than half of its circumference, and with a flat minor portion 8 occupying the remainder of said circumference, the major and minor portions 7-8 being in planes at a widely obtuse angle to each other, this being true of both the nut-facing side and the work facing side of said washer. The line of juncture between the portions 7-8 is denoted at 9, and due to the construction of the washer, this line of juncture is laterally spaced from and parallel with an imaginary diametrically line 12 (Fig. 1). At opposite sides of this line 12, the washer is intended to contact with the nut N as shown in Fig. 4, while at or near the line 9, said washer contacts with the work W. Hence, considering the washer in edge view as seen in Figs. 2 and 4, it corresponds substantially to a lever with one long end and one short end, the portion 9 of the washer corresponding to the lever fulcrum. As known in connection with levers, if one end be twice as long as the other end, application of force on the long end will produce twice as much force at the short end. I make use of substantially this same principle in the present invention, for upon tightening of the nut N, the minor portion 8 of the washer will create greater resistance to the nut tightening, thereby corresponding to the short end of the lever, whereas lesser resistance will be created by the major portion 7 of the washer, corresponding to the long end of the lever. It will thus be seen that greater pressure will be created on one side of the nut N by the washer portion 8, such pressure being denoted by the arrow G of Fig. 5, while lesser pressure denoted by the arrow G— in the same figure, will be created by the washer portion 7. By thus creating unequal pressures at opposite sides of the nut, there is a canting action applied to the latter which tightly binds its screw threads against those of the bolt B, assisting materially in preventing retrograde movement of the nut.

In the construction shown, the work-facing side of the washer 6 is provided with a tooth 10 and the nut-facing side of said washer is formed with nut-engaging teeth 11. All of these teeth are of ratchet-like form so that they will not interfere with tightening of the nut N, but upon such tightening, will remain in position to bite into the work and the nut in case the latter should tend to retrogradely rotate. There is thus a positive lock provided for the nut, as well as the frictional lock afforded by binding of its threads against the threads of the bolt B, due to the unequal pressure at opposite sides of the nut.

The teeth 10 and 11 are preferably formed without cutting any portions of the washer 6, so that the latter is not weakened in any manner whatsoever. However, if desired the teeth 10 and 11 may be cut out and struck up from the washer.

It will be seen from the foregoing that I have provided a new and improved lock washer which will be simple and inexpensive, unusually strong, effective to a high degree and generally desirable. Attention is again invited to the fact that numerous variations may be made within the scope of the invention as claimed and it will be understood that in addition to changes in materials, size proportions, etc., changes as to the number and location of the teeth 10–11 may also be made, the washer in fact without any of these teeth, being adequate for certain purposes.

I claim:—

1. A nut locking washer having two nut-engaging portions at opposite sides of a diametrical line and a work-engaging portion at one side only of said line, said work-engaging portion being relatively near to one of said nut-engaging portions but relatively distant from the other of said nut-engaging portions, whereby to obtain unequal pressure upon the nut at opposite sides of its center to frictionally bind the threads of said nut against those of the bolt.

2. A nut locking washer having a major portion occupying more than half its circumference and a minor portion occupying the remainder of said circumference, the nut-facing sides of said major and minor portions being disposed at a widely obtuse angle to each other, the work-facing sides of said major and minor portions being also disposed at a widely obtuse angle to each other, whereby to obtain unequal pressure upon the nut at opposite sides of its center to frictionally bind the threads of said nut against those of the bolt.

3. A structure as specified in claim 1; together with nut and work-engaging teeth on said washer.

4. A structure as specified in claim 2; together with nut and work-engaging teeth on said washer.

In testimony whereof I have hereunto affixed my signature.

WILLIAM J. CHISM.